US009877308B2

(12) United States Patent
Chrisikos et al.

(10) Patent No.: US 9,877,308 B2
(45) Date of Patent: Jan. 23, 2018

(54) INTERFERENCE MITIGATION TECHNIQUES FOR BROADCAST MULTIMEDIA RECEIVER DEVICE

(71) Applicant: QUALCOMM Incorporated, San Diego, CA (US)

(72) Inventors: George Chrisikos, San Diego, CA (US); Richard Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/824,026

(22) Filed: Aug. 11, 2015

(65) Prior Publication Data
US 2017/0048838 A1 Feb. 16, 2017

(51) Int. Cl.
*H04H 20/71* (2008.01)
*H04W 72/04* (2009.01)
(Continued)

(52) U.S. Cl.
CPC .... *H04W 72/0406* (2013.01); *H04N 21/4383* (2013.01); *H04N 21/44209* (2013.01);
(Continued)

(58) Field of Classification Search
CPC ............ H04W 72/0446; H04W 16/14; H04W 72/042; H04W 72/0453; H04W 84/12; H04W 88/02; H04W 72/1215; H04W 88/06; H04W 24/02; H04W 8/005; H04W 28/0236; H04L 5/14; H04L 43/16; H04L 27/2601; H04B 15/00
See application file for complete search history.

(56) References Cited

U.S. PATENT DOCUMENTS 8,830,934 B2   9/2014   Banister et al.
8,964,718 B2   2/2015   Sadek et al.
(Continued)

FOREIGN PATENT DOCUMENTS

WO   2013164037 A1   11/2013
WO   2014127189 A1   8/2014

OTHER PUBLICATIONS

International Search Report and Written Opinion—PCT/US2016/033809—ISA/EPO—dated Aug. 16, 2016.

*Primary Examiner* — Michael J Moore, Jr.
(74) *Attorney, Agent, or Firm* — Arent Fox, LLP

(57) ABSTRACT

In an aspect of the disclosure, a method, a computer-readable medium, and an apparatus are provided. The apparatus may be a broadcast multimedia receiver device. The apparatus detects a signal causing interference at a first radio of the receiver device. The first radio is configured to receive broadcast multimedia transmissions. The apparatus determines a RAT associated with an aggressor entity transmitting the signal. The aggressor entity is physically remote from the receiver device. The apparatus determines a mitigation action to mitigate the interference caused by the signal at the first radio. The apparatus transmits, at a second radio of the receiver device, a control message to the aggressor entity. The control message instructs the aggressor entity to implement the mitigation action. The second radio is configured to communicate with the aggressor entity using at least one RAT or a wired interface.

26 Claims, 9 Drawing Sheets

(51) Int. Cl.
    *H04W 48/16*    (2009.01)
    *H04W 4/00*     (2009.01)
    *H04N 21/438*   (2011.01)
    *H04N 21/442*   (2011.01)
    *H04N 21/45*    (2011.01)
    *H04W 16/14*    (2009.01)
    *H04W 84/12*    (2009.01)
    *H04W 72/00*    (2009.01)
    *H04W 72/08*    (2009.01)

(52) U.S. Cl.
    CPC ........ *H04N 21/4508* (2013.01); *H04W 4/005* (2013.01); *H04W 16/14* (2013.01); *H04W 48/16* (2013.01); *H04W 72/005* (2013.01); *H04W 72/082* (2013.01); *H04W 84/12* (2013.01)

(56) References Cited

U.S. PATENT DOCUMENTS

| | | | | |
|---|---|---|---|---|
| 9,681,316 B2* | 6/2017 | Lee | | H04W 24/02 |
| 9,736,875 B2* | 8/2017 | Wietfeldt | | H04W 76/023 |
| 9,743,440 B2* | 8/2017 | Wietfeldt | | H04W 76/023 |
| 2011/0007226 A1 | 1/2011 | Shintani et al. | | |
| 2012/0207040 A1 | 8/2012 | Comsa et al. | | |
| 2013/0208587 A1* | 8/2013 | Bala | | H04W 16/14 370/230 |
| 2013/0322276 A1* | 12/2013 | Pelletier | | H04W 72/085 370/252 |
| 2014/0036805 A1 | 2/2014 | Sadek et al. | | |
| 2014/0050146 A1* | 2/2014 | Chrisikos | | H04W 16/14 370/328 |
| 2014/0086162 A1 | 3/2014 | Rimini et al. | | |
| 2014/0135048 A1 | 5/2014 | Kasslin et al. | | |
| 2014/0314008 A1* | 10/2014 | Lee | | H04W 24/02 370/329 |
| 2014/0355557 A1* | 12/2014 | Peng | | H04W 16/14 370/330 |
| 2015/0296526 A1* | 10/2015 | Behravan | | H04W 16/14 370/329 |
| 2015/0334574 A1* | 11/2015 | Krishnamoorthy | | H04W 16/14 370/329 |
| 2015/0334575 A1* | 11/2015 | Joshi | | H04W 72/0453 370/329 |
| 2016/0050577 A1* | 2/2016 | Rao | | H04W 48/18 370/252 |
| 2016/0143074 A1* | 5/2016 | Wietfeldt | | H04W 76/023 370/329 |
| 2016/0269061 A1* | 9/2016 | Hwang | | H04B 1/1036 |
| 2016/0338121 A1* | 11/2016 | Wietfeldt | | H04W 76/023 |
| 2016/0360559 A1* | 12/2016 | Chrisikos | | H04W 76/02 |

* cited by examiner

INTERFERENCE MITIGATION TECHNIQUES FOR BROADCAST MULTIMEDIA RECEIVER DEVICE

BACKGROUND

Field

The present disclosure relates generally to communication systems, and more particularly, to techniques for controlling radios of wireless devices that cause interference at a broadcast multimedia receiver device.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Signal reception at a broadcast multimedia receiver device may be interfered by signal transmission from wireless communication entities that operate on various frequency bands/channels and using various radio access technologies (RATs). It may be desirable to mitigate the interference at the broadcast multimedia receiver device caused by the wireless communication devices/entities.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication of a broadcast multimedia receiver device is provided. The method includes detecting a signal causing interference at a first radio of the receiver device. The first radio is configured to receive broadcast multimedia transmissions. The method includes determining a RAT associated with an aggressor entity transmitting the signal. The aggressor entity is physically remote from the receiver device. The method includes determining a mitigation action to mitigate the interference caused by the signal at the first radio. The method includes transmitting, at a second radio of the receiver device, a control message to the aggressor entity. The control message instructs the aggressor entity to implement the mitigation action. The second radio is configured to communicate with the aggressor entity using at least one RAT or a wired interface.

According to an example, an apparatus for wireless communication is provided. The apparatus may be a broadcast multimedia receiver device. The apparatus includes means for detecting a signal causing interference at a first radio of the receiver device. The first radio is configured to receive broadcast multimedia transmissions. The apparatus includes means for determining a RAT associated with an aggressor entity transmitting the signal. The aggressor entity is physically remote from the receiver device. The apparatus includes means for determining a mitigation action to mitigate the interference caused by the signal at the first radio. The apparatus includes means for transmitting, at a second radio of the receiver device, a control message to the aggressor entity. The control message instructs the aggressor entity to implement the mitigation action. The second radio is configured to communicate with the aggressor entity using at least one RAT or a wired interface.

According to an example, an apparatus for wireless communication is provided. The apparatus may be a broadcast multimedia receiver device. The apparatus includes a memory and at least one processor coupled to the memory and configured to detect a signal causing interference at a first radio of the receiver device. The first radio is configured to receive broadcast multimedia transmissions. The at least one processor is further configured to determine a RAT associated with an aggressor entity transmitting the signal. The aggressor entity is physically remote from the receiver device. The at least one processor is further configured to determine a mitigation action to mitigate the interference caused by the signal at the first radio. The at least one processor is further configured to transmit, at a second radio of the receiver device, a control message to the aggressor entity. The control message instructs the aggressor entity to implement the mitigation action. The second radio is configured to communicate with the aggressor entity using at least one RAT or a wired interface.

According to an example, a computer-readable medium storing computer executable code for wireless communication at a broadcast multimedia receiver device is provided. The computer-readable medium includes code for detecting a signal causing interference at a first radio of the receiver device. The first radio is configured to receive broadcast multimedia transmissions. The computer-readable medium includes code for determining a RAT associated with an aggressor entity transmitting the signal. The aggressor entity is physically remote from the receiver device. The computer-readable medium includes code for determining a mitigation action to mitigate the interference caused by the signal at the first radio. The computer-readable medium includes code for transmitting, at a second radio of the receiver device, a control message to the aggressor entity. The control message instructs the aggressor entity to implement the mitigation action. The second radio is configured to communicate with the aggressor entity using at least one RAT or a wired interface.

DETAILED DESCRIPTION

Figure 1:
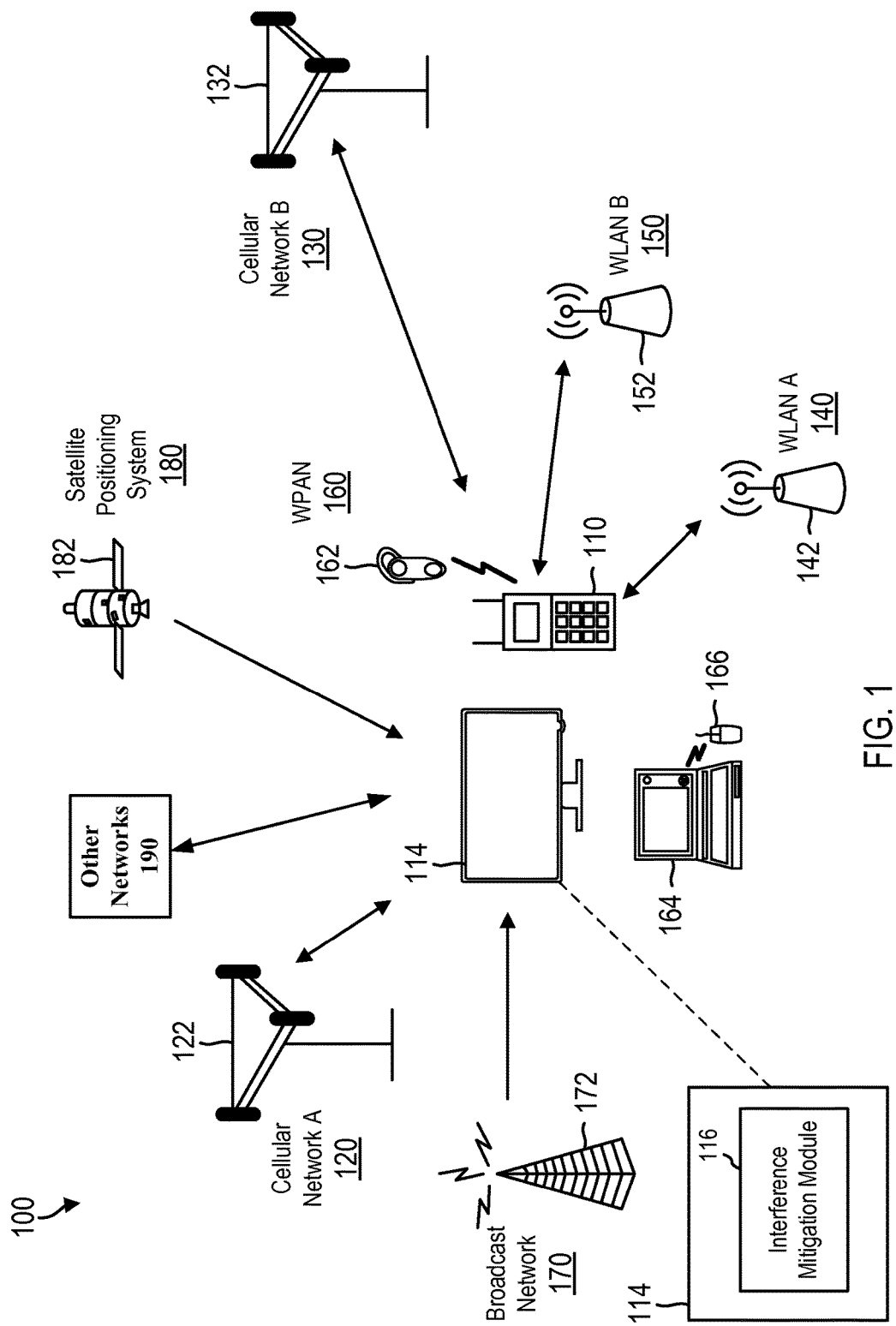
FIG. 1 shows multiple wireless communication networks.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 shows multiple wireless communication networks. These wireless networks may include one or more wireless wide area networks (WWANs) 120 and 130, one or more wireless local area networks (WLANs) 140 and 150, one or more wireless personal area networks (WPANs) 160, one or more broadcast networks 170, one or more satellite positioning systems 180, or other networks 190 (such as networks provided by small cell base stations, by floating base stations (balloons), by base stations on aerial drones, etc.), or any combination thereof. The terms "network" and "system" are often used interchangeably.

The WWANs may be cellular networks. More particularly, the cellular networks 120 and 130 may each be a CDMA, TDMA, FDMA, OFDMA, SC-FDMA, or some other network. A CDMA network may implement a radio technology or air interface such as Universal Terrestrial Radio Access (UTRA), CDMA2000, etc. UTRA includes Wideband CDMA (WCDMA) and other variants of CDMA. CDMA2000 covers IS-2000, IS-95, and IS-856 standards. IS-2000 is also referred to as CDMA 1x, and IS-856 is also referred to as Evolution-Data Optimized (EVDO). A TDMA network may implement a radio technology such as Global System for Mobile Communications (GSM), Digital Advanced Mobile Phone System (D-AMPS), etc. An OFDMA network may implement a radio technology such as Evolved UTRA (E-UTRA), Ultra Mobile Broadband (UMB), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). Cellular network 120 may include a number of base stations 122 that can support bi-directional communication for wireless devices within their coverage. Similarly, cellular network 130 may include a number of base stations 132 that can support bi-directional communication for wireless devices within their coverage.

The WLANs 140 and 150 may each implement a radio technology such as IEEE 802.11 (Wi-Fi), Hiperlan, etc. WLAN 140 may include one or more access points 142 that can support bi-directional communication. Similarly, WLAN 150 may include one or more access points 152 that can support bi-directional communication. WPAN 160 may implement a radio technology such as BLUETOOTH, IEEE 802.15, etc. WPAN 160 may support bi-directional communication for various devices such as wireless device 110, a headset 162, a computer 164, a mouse 166, etc.

Broadcast network 170 may be a television (TV) broadcast network, a frequency modulation (FM) broadcast network, a digital broadcast network, etc. A digital broadcast network may implement a digital terrestrial television (DTT) radio technology such as MediaFLO™, Digital Video Broadcasting for Handhelds (DVB-H), Integrated Services Digital Broadcasting for Terrestrial Television Broadcasting (ISDB-T), Advanced Television Systems Committee-Mobile/Handheld (ATSC-M/H), etc. Broadcast network 170 may include one or more broadcast stations 172 that can support one-way communication.

Satellite positioning system 180 may be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, etc. Satellite positioning system 180 may include a number of satellites 182 that transmit signals used for positioning.

The wireless device 110 may be stationary or mobile and may also be referred to as a user equipment (UE), a mobile station, a mobile equipment, a terminal, an access terminal, a subscriber unit, a station, etc. Wireless device 110 may be a cellular phone, a personal digital assistant (PDA), a wireless modem, a handheld device, a laptop computer, a cordless phone, a wireless local loop (WLL) station, a smart phone, a netbook, a smartbook, a broadcast receiver, etc. Wireless device 110 may communicate two-way with cellular networks 120 and/or 130, WLANs 140 and/or 150, devices within WPAN 160, etc. Wireless device 110 may also receive signals from broadcast network 170, satellite positioning system 180, etc. In general, wireless device 110 may communicate with any number of wireless networks and systems at any given moment.

The broadcast multimedia receiver device 114 may be a wireless device that is specially configured to receive signals, especially multimedia broadcast service signals, from the broadcast network 170.

In certain circumstances, although transmitting stations of one or more of the networks 120-160, 180-190 may be kilometers away (e.g., 1 kilometers, 2 kilometers, 5 kilometers away) from the broadcast multimedia receiver device 114, the signals from those networks may still be received at the broadcast multimedia receiver device 114 and may cause interference to the broadcast multimedia receiver device 114.

Furthermore, in certain circumstances, a wireless device 110 may be in a close proximity of the broadcast multimedia receiver device 114. The wireless device 110 may transmit uplink signals to one or more of the networks 120-190. The wireless device 110 may also receive downlink signals from one or more of the networks 120-190. Thus, the signal transmission between the wireless device 110 and the networks 120-190 may cause additional interference to the signal reception at the broadcast multimedia receiver device 114. Further, although FIG. 1 only shows one wireless device 110, more than one wireless device may be in proximity of the broadcast multimedia receiver device 114. These wireless devices in proximity of the broadcast multimedia receiver device 114 may similarly cause interference to the broadcast multimedia receiver device 114. The maximum distance from the broadcast multimedia receiver device 114 to be considered as a distance in proximity of the broadcast multimedia receiver device 114 may be different in different circumstances. For example, the maximum distance may be 5 meters, 10 meters, 15 meters, or 20 meters.

For example, analog TV spectrum has transitioned to digital dividend, e.g., UHF 470 to 862 MHz. In many geographic areas these DTT channels are in close proximity to LTE bands, resulting in interference issues preventing reliable operation of the TV receivers. LTE UE and eNodeB aggressor entities may desense DTT receivers. Some amelioration techniques require installing external filters on DTT equipment, which can be expensive. In some cases, external filtering may not solve the LTE interference problem due to insufficient or zero guard bands. As described supra, in addition to downlink interference from LTE base stations, uplink transmission from LTE UEs can also cause interference to the DTT receivers in proximity.

Figure 2:
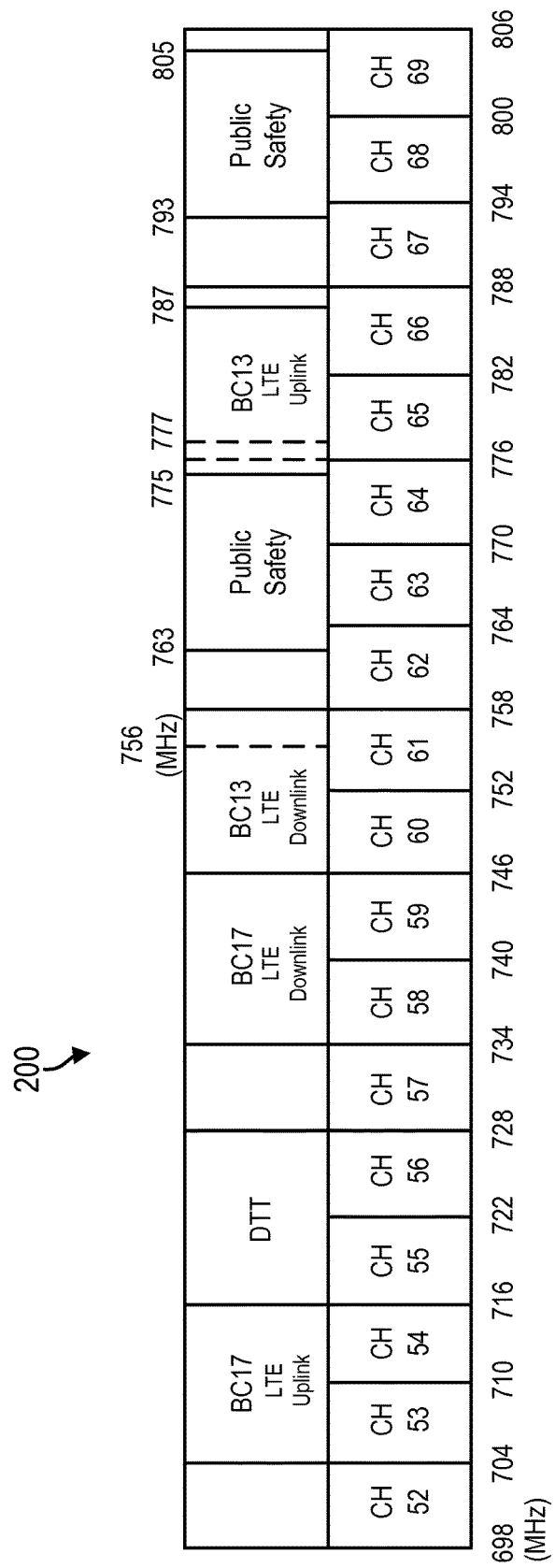
FIG. 2 is a diagram illustrating channel allocation of LTE bands and multimedia broadcast services.

FIG. 2 is a diagram 200 illustrating channel allocation of LTE bands and multimedia broadcast services. As shown, the UHF channels 53-69 span from 698 MHz to 806 MHz. In this example, the frequencies of the UHF channels 53-54 (i.e., from 704 MHz to 716 MHz) are used for LTE channel 17 uplink. The frequencies of the UHF channels 58-59 (i.e., from 734 MHz to 746 MHz) are used for LTE channel 17 downlink. Some frequencies of the UHF channels 60-61 (i.e., from 746 MHz to 757 MHz) are used for LTE channel 13 downlink. Some frequencies of the UHF channels 65-66 (i.e., from 777 MHz to 787 MHz) are used for LTE channel 17 uplink. Further, the UHF channels 55-56 (i.e., from 716 MHz to 728 MHz) were intended to be used for multimedia broadcast services (e.g., a DTT service).

The guard band between the multimedia broadcast service and the LTE channel 17 uplink is zero MHz. The guard band between the multimedia broadcast service and the LTE channel 13 uplink is 49 MHz. The guard band between the multimedia broadcast service and the LTE channel 17 downlink is 6 MHz. The guard band between the multimedia broadcast service and the LTE channel 13 uplink is 18 MHz.

Because of the interference described supra, the UHF channels 55-56 may not be suitable for multimedia broadcast services and may be reused for other purposes. Further, other possible spectrum rollouts for LTE in the future may interfere with other multimedia broadcast services bands.

As described supra, LTE transmission may desense multimedia broadcast service receivers (e.g., DTT receivers). For example, LTE rollouts interfere with DTT service in the 800 MHz bands in Europe. Amelioration techniques employing external filters incur additional cost and can be expensive and in some cases do not solve the LTE interference problem.

As such, referring back to FIG. 1, at the broadcast multimedia receiver device 114, the signal reception of the multimedia broadcast services transmitted from the broadcast network 170 may be interfered by the downlink transmission of the LTE channel 17 downlink and the LTE channel 13 downlink from the cellular networks 120, 130. Further, the uplink transmission from a wireless device 110 in proximity of the broadcast multimedia receiver device 114 may also cause interference to the signal reception of the multimedia broadcast service at the broadcast multimedia receiver device 114.

To mitigate the interference, in certain configurations, the broadcast multimedia receiver device 114 may include an interference mitigation module/circuitry 116. The interference mitigation module/circuitry 116 may control a process of detecting a signal causing interference at a first radio of the broadcast multimedia receiver device 114. The first radio is configured to receive broadcast multimedia transmissions. The interference mitigation module/circuitry 116 may also control a process of determining a RAT associated with an aggressor entity transmitting the signal. The aggressor entity is physically remote from the broadcast multimedia receiver device 114. Further, the interference mitigation module/circuitry 116 may control a process of determining a mitigation action to mitigate the interference caused by the signal at the first radio. Yet further, the interference mitigation module/circuitry 116 may control a process of transmitting, at a second radio of the broadcast multimedia receiver device 114, a control message to the aggressor entity. The control message instructs the aggressor entity to implement the mitigation action. The second radio is configured to communicate with the aggressor entity using at least one RAT or a wired interface.

Figure 3:
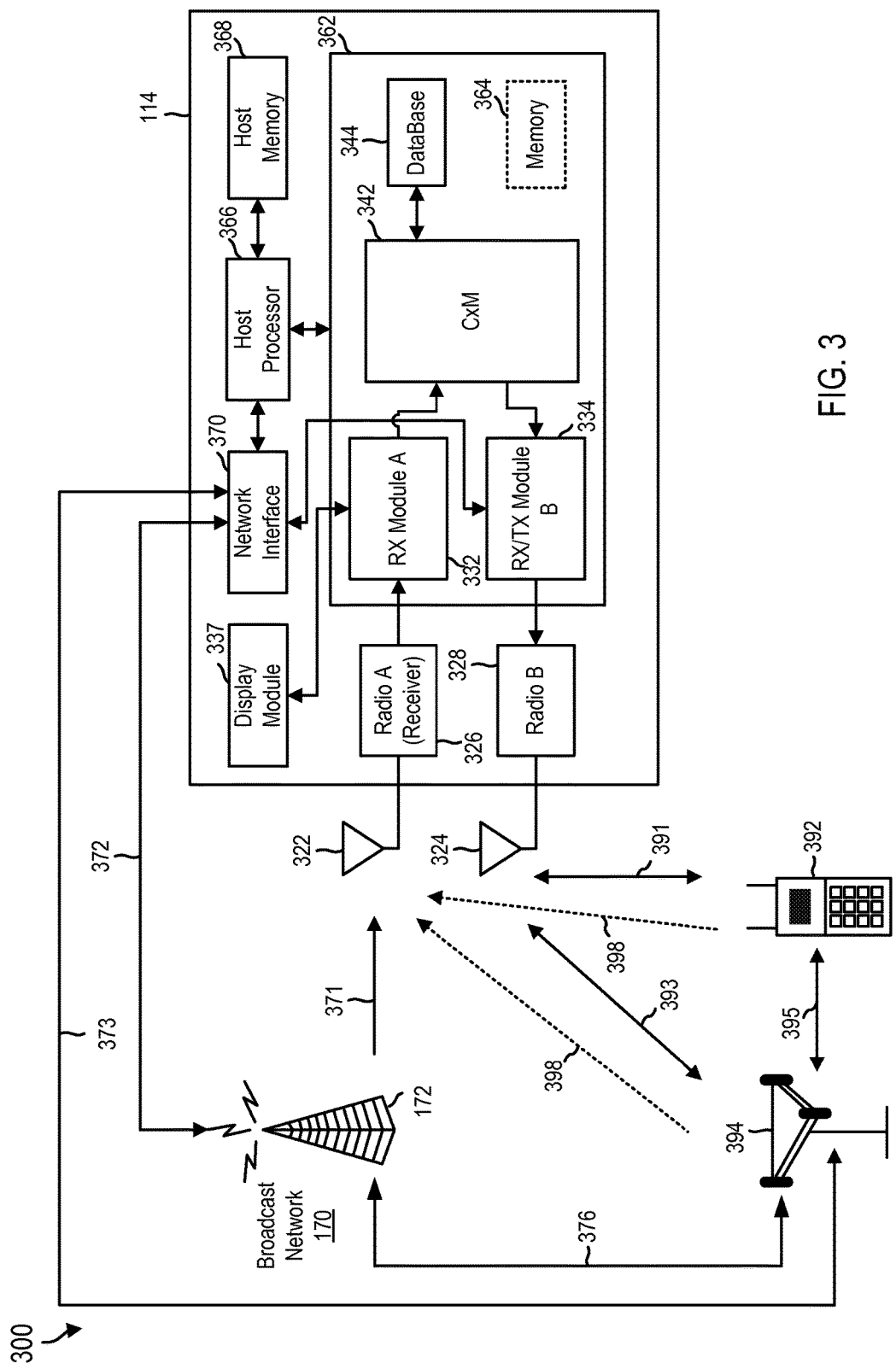
FIG. 3 is a diagram illustrating signal communication between a broadcast multimedia receiver device and an aggressor entity.

FIG. 3 is a diagram 300 illustrating signal communication between a broadcast multimedia receiver device and an aggressor entity. A wireless device 392 is in proximity of the broadcast multimedia receiver device 114. The wireless device 392 may be managed by a network access point 394. As an example, the broadcast multimedia receiver device 114 may receive multimedia broadcast services 371 from the broadcast station 172. In this example, the broadcast multimedia receiver device 114 may include a radio A 326, a radio B 328, an RX module/circuitry A 332, a TX/RX module/circuitry B 334, a coexistence manager (CxM) 342, a coexistence database 344, a processor 362, a memory 364, a host processor 366, a host memory 368, a network interface 370, and a display module/circuitry 337.

For simplicity, FIG. 3 shows that the radio A 326 and the radio B 328 are coupled to the antenna A 322 and the antenna B 324, respectively. Nonetheless, each radio of the radios 326, 328 may be coupled to any number of antennas. The radios 326, 328 may also share one or more antennas.

In general, a radio may be a unit that radiates or emits energy in an electro magnetic spectrum, receives energy in an electro magnetic spectrum, or generates energy that is passed via conductive means. As some examples, a radio may be (i) a unit that transmits a signal to a system or a device or (ii) a unit that receives signals from a system or a device. A radio may thus support wireless communication. A radio may also be a unit (e.g., a screen on a computer, a circuit board, etc.) that emits noise, which may impact the performance of other radios. A radio may thus be a unit that emits noise and interference without supporting wireless communication. For simplicity, much of the description below is for radios used for wireless communication.

The radios 326, 328 each may comprise one or more types of radios. A radio may comprise a set of circuits designed to transmit or receive on a particular band for a particular system. A radio may also be a software defined radio (SDR) that may be configured to support multiple systems and/or multiple bands. For example, an SDR may include programmable circuits (e.g., tunable/switchable radio frequency (RF) filters, switched filter bank, tunable matching networks, etc.) that can operate at different frequencies. An SDR may also include programmable processing units that can perform processing for different systems. An SDR may be configured to operate on a particular band for a particular system at any given moment. A radio may also be a cognitive radio that can search for a clear frequency channel and operate on the clear frequency channel. A frequency channel may also be referred to as simply a channel.

In this example, the radio A 326 is specially configured to support receiving multimedia broadcast service signals from the broadcast network 170. The RX module/circuitry A 332 may be coupled to the radio A 326 and may perform various functions such as processing for the radio A 326, which may include, among other things, decoding, demodulation, and decryption of the received signals to obtain the multimedia broadcast service data. The RX module/circuitry A 332 may send the multimedia broadcast service data to the display module/circuitry 337, which may render the multimedia broadcast service data on a display unit such as a monitor screen or a TV set.

The radio B 328 may support communication with various systems such as the networks 120-190. The radio B 328 may operate on one or more frequency bands/channels of one or more RATs. In certain configurations, the radio B 328 may include multiple radios B 328. For example, one radio B 328 may be configured to transmit and another radio B 328 may be configured to receive for a system. Multiple radios B 328 may also be defined for different frequency bands, e.g., cellular and personal communications service (PCS) bands.

The TX/RX module/circuitry B 334 may be coupled to the radio B 328 and may perform various functions such as processing for the radio B 328, which may include, among other things, encoding, decoding, modulation, demodulation, encryption, decryption, etc. The processing for the radio B 328 may be dependent on a particular RAT being utilized to access one or more of the networks 120-190.

The RX module/circuitry A 332 and the TX/RX module/circuitry B 334 each are in communication with the coexistence manager 342 that may determine a mitigation action and controls the radio B 328 and the TX/RX module/circuitry B 334, as described infra. The RX module/circuitry A 332 and the TX/RX module/circuitry B 334 each may include an interface unit for communicating with the coexistence manager 342 and/or other entities. The coexistence manager 342 is in communication with the coexistence database 344, which may store information of interference at the radio A 326 caused by at least one wireless device.

In this example, the RX module/circuitry A 332, the TX/RX module/circuitry B 334, the coexistence manager 342, the coexistence database 344 may be implemented by the processor 362 including the internal memory 364. Further, the processor 362 may comprise any number and any type of processors, controllers, memories, etc. For example, the processor 362 may comprise one or more processors, microprocessors, central processing units (CPUs), digital signal processors (DSPs), reduced instruction set computers (RISCs), advanced RISC machines (ARMs), controllers, etc. As one example, the processor 362 may be implemented on a Mobile Station Modem (MSM) application specific integrated circuit (ASIC). The processor 362 may also perform processing for physical layer (L1), media access control (MAC) layer (L2), upper layer (L3), and/or other layers.

The host processor 366 may direct the operation of various units within the broadcast multimedia receiver device 114. The host memory 368 may store program codes and data for wireless device 110. The processor 362, the host processor 366, and the host memory 368 may be implemented on one or more integrated circuits (ICs), ASICs, etc.

As described supra, signal reception at the broadcast multimedia receiver device 114 may be interfered by one or more wireless devices 392 or one or more network access points 394 of the networks 120-190. An interfering wireless device 392 or an interfering network access point 394 may be referred to as an aggressor entity. For simplicity, FIG. 3 only shows one wireless device 392 and one network access point 394. For example, the wireless device 392 may be cellular user equipment (UE), a WLAN station, etc. The network access point 394 may be an evolved node B (eNodeB), a WLAN access point, a base station, a small cell base station, a floating base station (balloon), a base station on an aerial drone, etc.

The coexistence manager 342 may, through the RX module/circuitry A 332, monitor the interference at the radio A 326. The coexistence manager 342 can detect interference signals 398 from an aggressor entity based on a measured received signal strength indication (RSSI), jammer detection, etc. In certain configurations, the interference caused by the signal transmission from an aggressor entity may be detected based on an RSSI, a signal-to-noise ratio (SNR), a signal-to-interference-plus-noise ratio (SINR), or any combination thereof.

The coexistence manager 342 may further determine certain characteristics of the interference signals 398. The characteristics may include transmission frequency band, transmission frequency channel, transmission power level, transmission duration/pattern, etc. Based on the characteristics of the interference signals 398, the coexistence manager 342 may determine the RAT used by the aggressor entity. The RAT may include a WWAN RAT such as LTE. Further, based on the characteristics of the interference signals 398, the coexistence manager 342 may determine what type of device the aggressor entity is.

Based on the characteristics of the interference signals 398 and/or the type of the aggressor entity, the coexistence manager 342 may determine a communication protocol that can be used to communicate with the aggressor entity. The communication protocol may be based on a device-to-device (D2D) RAT, a WWAN RAT, a WLAN RAT, a BLUETOOTH technology, etc. For example, if the coexistence manager 342 determines that the aggressor entity is an LTE eNodeB (e.g., the network access point 394), the coexistence manager 342 may then determine to use an LTE UL to communicate with the LTE eNodeB. If the coexistence manager 342 determines that the aggressor entity is an LTE UE (e.g., the wireless device 392), the coexistence manager 342 may then determine to use a D2D communication protocol to communicate with the LTE UE. The D2D communication protocol may be one of LTE Direct (aka LTE Proximity Services (ProSe)), Wi-Fi Direct (aka Wi-Fi Aware), BLUETOOTH Low Energy, etc. As described supra in more detail, the coexistence manager 342 may send to the aggressor entity, in accordance with the communication protocol, one or more control messages requesting the aggressor entity to adjust the operating state, etc. of the aggressor entity.

Further, in certain circumstances, the coexistence manager 342 may determine that the coexistence manager 342 cannot communicate with the aggressor entity (e.g., the wireless device 392) directly. Accordingly, the coexistence manager 342 may determine to communicate with the aggressor entity through an intermediate node (e.g., the network access point 394). The coexistence manager 342 then may determine a communication protocol that can be used to communicate with the intermediate node. As described supra in more detail, the coexistence manager 342 may send to the intermediate node, in accordance with the communication protocol, one or more control messages requesting the intermediate node to accordingly instruct the aggressor entity to adjust the operating state, etc. of the aggressor entity. Upon receiving the control messages, the intermediate node may send corresponding instructions to the aggressor entity.

Further, the coexistence manager 342 may determine that the aggressor entity can be communicated with via a wired communication link 372 (e.g., an Ethernet connection) established between the broadcast multimedia receiver device 114 and the broadcast station 172 and a backhaul link 376 established between the broadcast station 172 and the aggressor entity. The coexistence manager 342 may determine that the aggressor entity can be alternatively communicated with via a wired communication link 373 (e.g., an Ethernet connection) established between the broadcast multimedia receiver device 114 and the aggressor entity.

Further, in certain configurations, upon determining a D2D communication protocol to be used to communicate with the aggressor entity, the coexistence manager 342 may further use one or more discovery procedures of the D2D communication protocol to identify potential aggressor entities in range (e.g., the wireless device 392, the network access point 394). If the coexistence manager 342 is not able to determine the D2D communication protocol supported by the aggressor entity, the coexistence manager 342 may try one or more from a list of D2D communication protocols stored at the coexistence manager 342 or the coexistence database 344. The coexistence manager 342 accordingly initiates the discovery procedure of the selected communication protocol. In one example, based on the characteristics of the interference signals 398, the coexistence manager 342 may determine that the aggressor entity is an LTE UE. The coexistence manager 342 then may try to use one or more of LTE Direct, Wi-Fi Direct, BLUETOOTH Low Energy, etc. to communicate with the LTE UE.

Within the discovery procedure, the coexistence manager 342 may instruct the TX/RX module/circuitry B 334 to transmit, via the radio B 328, discovery signals that request the aggressor entity to identify itself. Accordingly, the aggressor entity may respond to the discovery signals with a response message including the identity of the aggressor entity. The radio B 328 receives the signals representing the response message. The TX/RX module/circuitry B 334 may process the signals and reconstruct the response message. The TX/RX module/circuitry B 334 then sends the response message to the coexistence manager 342. As such, through the discovery procedure, the coexistence manager 342 may identify the aggressor entity.

In another example, based on the characteristics of the interference signals 398, the coexistence manager 342 may determine that the aggressor entity is an LTE entity (e.g., an eNodeB or a UE). Accordingly, the coexistence manager 342 may use an LTE procedure (such as scanning and network selection) to locate and identify an LTE eNodeB, which may be the aggressor entity or may manage the aggressor entity (e.g., a UE). The coexistence manager 342 may communicate with the LTE eNodeB on an LTE UL in accordance with LTE protocols.

In certain networks, upon identifying the aggressor entity, the coexistence manager 342 may determine that the aggressor entity can receive and process control messages through one or more communication protocols. Accordingly, the coexistence manager 342 may select a communication protocol to communicate with the aggressor entity. The coexistence manager 342 may establish a communication link directly with the aggressor entity directly in accordance with the selected communication protocol.

In one example, the coexistence manager 342 may determine that the network access point 394 is the aggressor entity, and the network access point 394 may be an LTE eNodeB. Accordingly, the coexistence manager 342 may establish a communication link 393 (e.g., an LTE UL) with the network access point 394 and may use LTE control plane signaling to communicate with the network access point 394. The coexistence manager 342 may construct a query message requesting information of configurable parameters or an operating state, which is described infra in more detail, of the network access point 394 (i.e., the aggressor entity). The coexistence manager 342 then instructs the TX/RX module/circuitry B 334 to operate the radio B 328 to transmit the query message to the network access point 394 on the control plane of the network access point 394 (e.g., an LTE eNodeB). The radio B 328 may subsequently receive signals representing a response message carrying the requested information from the network access point 394 (i.e., the aggressor entity). The TX/RX module/circuitry B 334 processes the received signals to obtain the response message and, then, forwards the obtained response message to the coexistence manager 342.

Upon obtaining the operating state or the configurable parameters of the network access point 394, the coexistence manager 342 may determine a mitigation action to be applied to the network access point 394 in order to reduce the interference caused by the aggressor entity at the radio A 326 of the broadcast multimedia receiver device 114. As will be described infra in more detail, the mitigation action to be applied to an aggressor entity may include adjusting one or more configurable parameters of a transmitter radio of the network access point 394 (i.e., an aggressor radio) or changing the transmitter radio from one operating state to another operating state. For example, the mitigation action may be adjusting one or more of a transmission power, transmission time/frequency coordination, and a transmission channel. Further, the mitigation action may be applying time multiplexing. Particularly, the mitigation action may be reducing the transmission power, adjusting the transmission frequency of the aggressor entity to be further away from the frequency of the multimedia broadcast services received at the broadcast multimedia receiver device 114, and/or transmitting during the broadcast gaps of the multimedia broadcast services.

The coexistence database 344 may store information that indicates the interference at the radio A 326 as a function of one or more of a RAT, a frequency band, a frequency channel, a transmission power, etc., of an aggressor radio. As described infra referring to FIG. 4 in more detail, the combination of the RAT, the frequency band, the frequency channel, the transmission power, etc., may define an operating state of the aggressor radio. Thus, based on the information of stored in the coexistence database 344, the coexistence manager 342 may determine a mitigation action that changes the aggressor radio from one operating state to another operating state.

Based on the determined mitigation action, the coexistence manager 342 may construct a control message that request the aggressor entity to implement the mitigation action in accordance with the communication protocol used by the coexistence manager 342 to communicate with the network access point 394. Subsequently, the coexistence manager 342 instructs the TX/RX module/circuitry B 334 to transmit the control message to the network access point 394 on the communication link 393.

In another example, the aggressor entity may be the wireless device 392. The wireless device 392 may be an LTE UE in a close proximity to the broadcast multimedia receiver device 114 and may be communicating with the network access point 394 (i.e., an LTE eNodeB) on an LTE UL. The radio A 326 receives the interference signals 398 transmitted from the wireless device 392 and observes interference. Based on the characteristic of the interference signals 398 (e.g., the frequency band, the frequency channel, the energy level, the estimated distance between the aggressor entity and the broadcast multimedia receiver device 114), the coexistence manager 342 of the broadcast multimedia receiver device 114 can determine that the RAT used by the wireless device 392 is an LTE UL. The coexistence manager 342 may determine that the wireless device 392 is an LTE UE transmitting on the LTE UL. The coexistence manager 342 may further determine that an LTE UE may support LTE Direct. Accordingly, the coexistence manager 342 may decide to use LTE Direct to communicate with the wireless device 392. More specifically, the coexistence manager 342 uses the discovery procedure in accordance with LTE Direct to discover the wireless device 392. Upon identifying the wireless device 392, the coexistence manager 342 may establish a communication link 391 with the wireless device 392 and may use a communication protocol of LTE Direct to communicate with the wireless device 392. If the wireless device 392 is not responding in accordance with LTE Direct, the coexistence manager 342 may try to communicate with the wireless device 392 through one or more other D2D communication protocols (e.g., Wi-Fi Direct, BLUETOOTH Low Energy). The coexistence manager 342 may construct a query message requesting information of the operating state of the wireless device 392 (i.e., the aggressor entity). The coexistence manager 342 then instructs the TX/RX module/circuitry B 334 to operate the radio B 328 to transmit the query message to the wireless device 392 on the communication link 391. The radio B 328 may subsequently receive signals representing a response message carrying the requested information from the wireless device 392. The TX/RX module/circuitry B 334 processes the received signals to obtain the response message and, then, forwards the obtained response message to the coexistence manager 342. The coexistence manager 342 may determine, based on the operating state of the wireless device 392 and the information stored in the coexistence database 344, a mitigation action to be applied to the wireless device 392 in order to reduce the interference at the radio A 326 caused by the wireless device 392.

Based on the determined mitigation action, the coexistence manager 342 may construct a control message that requests the wireless device 392 to implement the mitigation action in accordance with LTE Direct. Subsequently, the coexistence manager 342 instructs the TX/RX module/circuitry B 334 to transmit the control message to the wireless device 392 on the communication link 391.

In certain networks, based on the characteristics and/or the RAT of the interference signals 398, the coexistence manager 342 may determine that the aggressor entity is a device managed by a network access point. For example, the coexistence manager 342 may determine, based on the characteristics (e.g., the frequency band, the frequency channel, the energy level, the estimated distance between the aggressor entity and the broadcast multimedia receiver device 114) of the interference signals 398, that the aggressor entity is the wireless device 392, which is an LTE UE transmitting on an LTE uplink frequency channel. The coexistence manager 342 may determine that the wireless device 392 is managed by the network access point 394 (e.g., an LTE eNodeB). Further, the transmission operation of the wireless device 392 may be controlled by the network access point 394. Accordingly, the coexistence manager 342 may initiate a discovery procedure to identify the network access point 394 as described supra. Upon identifying the network access point 394, the coexistence manager 342 may select a communication protocol to communicate with the network access point 394, rather than directly with the wireless device 392 (i.e., aggressor entity). In this example, the coexistence manager 342 may determine that the network access point 394 is an LTE eNodeB, and the wireless device 392 is an LTE UE. Accordingly, the coexistence manager 342 may establish the communication link 393 with the network access point 394 and may use LTE control plane signaling to communicate with the network access point 394. The coexistence manager 342 may construct a query message requesting, from the network access point 394, information of the operating state of the wireless device 392 (i.e., the aggressor entity). The coexistence manager 342 then instructs the TX/RX module/circuitry B 334 to operate the radio B 328 to transmit the query message to the network access point 394 on the communication link 393. The radio B 328 may subsequently receive signals representing a response message carrying the requested information from the network access point 394. In certain configurations, the network access point 394 may communicate with the wireless device 392 on a communication link 395 established between the network access point 394 and the wireless device 392 to obtain the requested information. The TX/RX module/circuitry B 334 processes the received signals to obtain the response message and, then, forwards the obtained response message to the coexistence manager 342.

Upon obtaining the operating state of the wireless device 392, the coexistence manager 342 may determine a mitigation action to be applied to the aggressor entity in order to reduce the interference caused by the wireless device 392 at the radio A 326 of the broadcast multimedia receiver device 114. For example, the mitigation action may be adjusting one or more of a transmission power, transmission time/frequency coordination, and a transmission channel, as described supra.

Based on the determined mitigation action, the coexistence manager 342 may construct a control message that request the network access point 394 to instruct the wireless device 392 to implement the mitigation action. The coexistence manager 342 instructs the TX/RX module/circuitry B 334 to transmit the control message to the network access point 394 on the communication link 393. Subsequently, the network access point 394 may send instructions/requests for implementing the mitigation action to the wireless device 392 on the communication link 395.

In certain configurations, the broadcast multimedia receiver device 114 may employ the network interface 370 to communicate with the broadcast network 170 on a wired communication link 372. Further, the broadcast station 172 may be in communication with the network access point 394 through the backhaul link 376. Accordingly, rather than sending the control messages to the network access point 394 wirelessly through an air interface, the coexistence manager 342 may send the control messages to the broadcast station 172 on the wired communication link 372, which in turn sends the control messages to the network access point 394 on the backhaul link 376.

In certain configurations, the broadcast multimedia receiver device 114 may employ the network interface 370 to communicate with the aggressor entity (e.g., the network access point 394) on a wired communication link 373 (e.g., an Ethernet connection). Accordingly, rather than sending the control messages to the network access point 394 wirelessly through an air interface, the coexistence manager 342 may send the control messages to the network access point 394 on the wired communication link 373.

In certain circumstances, more than one aggressor entity may cause interference at the radio A 326 simultaneously. For example, the network access point 394 may be an LTE eNodeB and the wireless device 392 may be an LTE UE in a close proximity of the broadcast multimedia receiver device 114. The radio A 326 may observe interference from the network access point 394 and the wireless device 392 at the same time. The coexistence manager 342 may use the techniques described supra to identify each aggressor entity (e.g., the network access point 394 and the wireless device 392). Then the coexistence manager 342 can determine a respective mitigation action to be applied to a respective aggressor entity using the techniques described supra. The coexistence manager 342 may construct a control message indicating the mitigation action for each aggressor entity in accordance with the communication protocol to be used to communicate that aggressor entity. Then the coexistence manager 342 use the TX/RX module/circuitry B 334 and the radio B 328 to transmit each control message to a corresponding aggressor entity using a corresponding communication protocol.

A transmitter radio of an aggressor entity (i.e., an aggressor radio) may have one or more configurable parameters that may be adjusted to mitigate interference caused by the aggressor radio at the radio A 326 of the broadcast multimedia receiver device 114, thus improving performance of the radio A 326. A configurable parameter may be for a physical component within the aggressor radio, such as an amplifier, a filter, an antenna, an antenna array, etc. A configurable parameter may also be for an operational parameter such as a transmit power level, a frequency channel, a traffic channel, etc. A received power level may also be a configurable parameter if it can be varied, e.g., by selecting different antennas and/or more antennas. Each configurable parameter may be set to one of multiple possible settings/values applicable for that parameter. The aggressor radio may have an operating state, which may be defined by a particular setting for each configurable parameter. A configurable parameter may also be referred to as a "knob," a configurable parameter setting may also be referred to as a "knob setting," and an operating state may also be referred to as a "knob state."

More specifically, the coexistence manager 342 may determine a mitigation action to be applied to a particular aggressor entity (e.g., the wireless device 392) and that includes adjusting one or more configurable parameters of the transmitter radio of the aggressor entity (i.e., adjusting knobs of the aggressor radio). That is, the mitigation action may change the aggressor radio from one operating state to another operating state. As described supra, the coexistence manager 342 may construct a control message requesting the particular aggressor entity to implement the mitigation action and may send the control message to the particular aggressor entity. The particular aggressor entity may control its aggressor radio based on the control messages received from coexistence manager 342. For example, the control message may request the aggressor entity to control RF parameters, antenna parameters, baseband parameters, protocols and their parameters, etc. The RF parameters may include receiver sensitivity, spurious response, linearity and noise, filtering, traps, insertion loss, adjacent channel rejection, filter selectivity, large signal parameters (e.g., RX blocking, wanted signals and unwanted harmonics, cross-compression, reciprocal mixing, oscillator pulling, etc.), small signal parameters (e.g., out-of-band phase noise of transmitter in receive band, reciprocal mixing, spurious receiver response, etc.), dynamic control mechanisms, transmit power control, digital predistortion (DPD), tunable filters, etc. The antenna parameters may include the number of antennas, diversity scheme, antenna sharing and switching control, physical geometry, antenna to antenna coupling loss, isolation, transmit/receive (T/R) switch, antenna spacing, polarization, etc. The baseband parameters may include interference cancellation algorithms, adaptive notch filter, spectrum sensing, adaptive algorithms, jamming scenarios, adaptive hopping, traffic sensing and detection, cognitive methods to orthogonalize radios, coding and modulation control (back-off), cognitive methods to orthogonalize radios, etc. The protocols and their parameters may include time division multiplex (TDM) coordination, Medium Access Control (MAC) scheduling, temporal solutions, interference avoidance, band selection, deferred transmission, packet timing information, priority information, inhibit transmissions, packet retries, queuing, etc. Other configurable parameters may also be controlled to mitigate interference and achieve good performance.

As an example, the coexistence manager 342 may request, through a control message, the aggressor entity (e.g., the wireless device 392) to increase the bias current of the aggressor radio in order to improve the linearity of a power amplifier of the aggressor radio, thus reducing adjacent channel power ratio (ACPR) and the amount of interference to the radio A 326. The coexistence manager 342 may also request, through a control message, the aggressor entity to use predistortion or other linearization techniques to lower ACPR and to reduce desense of the radio A 326. The coexistence manager 342 may request, through a control message, the aggressor entity to make changes to a fractional-N PLL (e.g., changes to divide ratios or reference clock) to reduce or move spurs causing desense, changes to the clock rate (e.g., chipx32, 64, or 96) of digital-to-analog converters (DACs) to reduce DAC image, etc.

Figure 4:
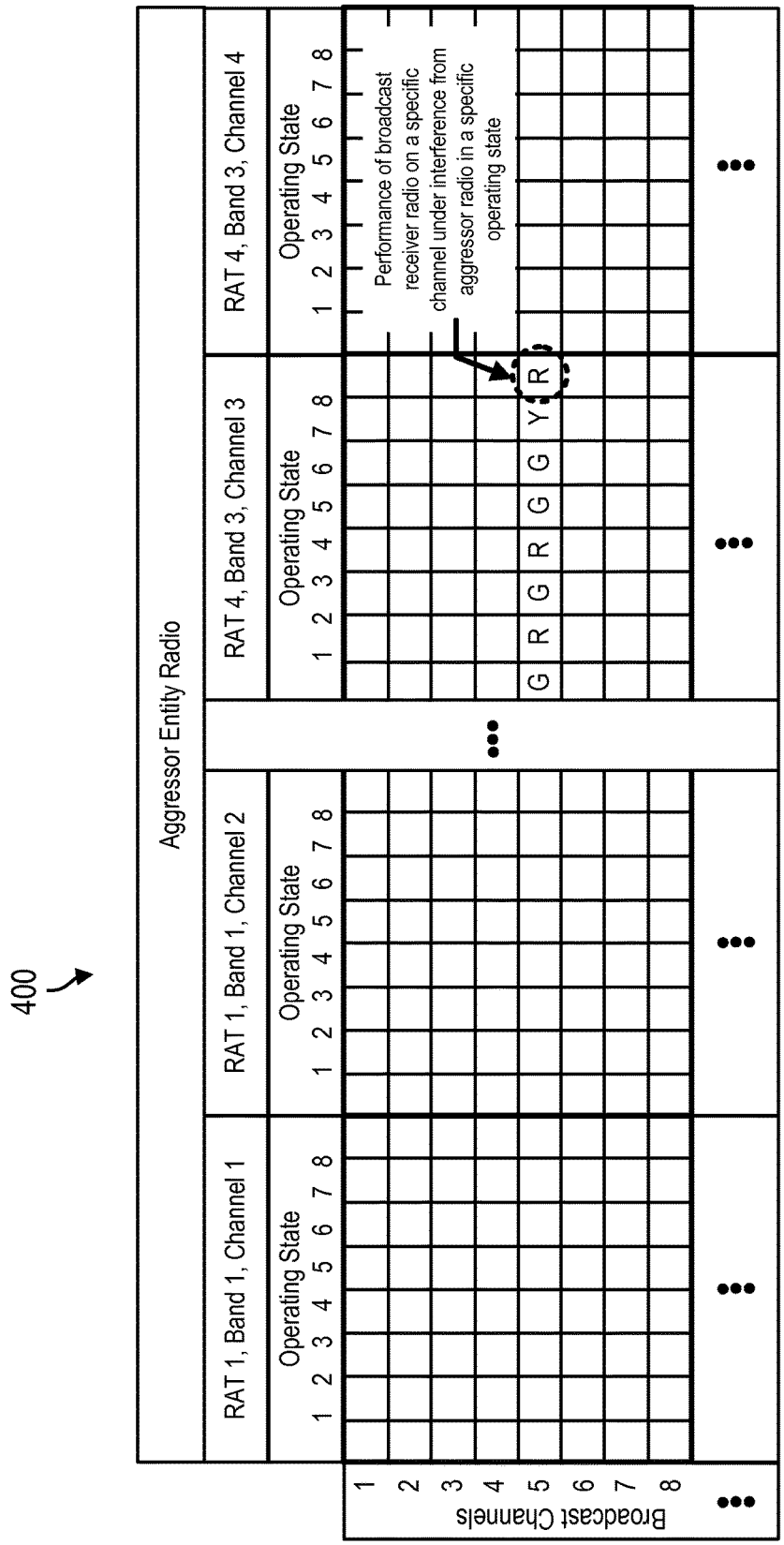
FIG. 4 shows a design of a color chart.

FIG. 4 shows a design of a color chart 400 that is managed by the coexistence database 344 and that may be used by the coexistence manager 342 to determine the mitigation actions. In color chart 400, the horizontal axis may be for an aggressor radio, which may cause interference and may be controllable. The vertical axis may be for channels of the broadcast multimedia receiver device 114, which may be adversely impacted by the interference from the aggressor radio. For simplicity, FIG. 4 shows only some RATs, some frequency bands, and some frequency channels for one or more of the aggressor radios and only some frequency channels for the broadcast multimedia receiver device 114. The aggressor radios may be from one or more entities of the networks 120-190. The color chart 400 may cover other radios and other RATs, frequency bands, and frequency channels that are not shown in FIG. 4.

The color chart 400 includes a number of column sets for different RATs, frequency bands, frequency channels (e.g., RAT 1, band 1, channel 1) on which various aggressor radios can operate. Each column set includes a number of columns for different operating states (or knob states) of the aggressor radio, as described supra. In the example shown in FIG. 4, each column set includes eight columns for eight different operating states (i.e., operating states 1-8) of the aggressor radio. Fewer or more operating states may also be supported for the aggressor radio. Each aggressor radio may have any number of operating states. One column may be provided for each operating state that may be selected for the aggressor radio to implement a mitigation action described supra.

The color chart 400 also includes a number of rows for different frequency channels (e.g., channels 1-8) on which the radio A 326 of the broadcast multimedia receiver device 114 can operate.

In the design shown in FIG. 4, the performance of the radio A 326 may be quantified by (or quantized to) one of three possible levels—"acceptable", "marginal", and "unacceptable" or "severe". The acceptable, marginal, and unacceptable levels may be represented by green (G), yellow (Y), and red (R) colors, respectively, in color chart 400. The acceptable level may correspond to a case in which the performance of the radio A 326 of the broadcast multimedia receiver device 114 meets all applicable requirements. The marginal level may correspond to a case in which (i) the performance of the radio A 326 meets all applicable requirements but possibly with small margins or (ii) the performance of the radio A 326 meets key requirements but possibly not all requirements. The unacceptable level may correspond to a case in which the performance of the radio A 326 does not meet applicable requirements and should be improved. In general, performance may be quantified with any number of levels, e.g., 2, 4, etc. Each level may be defined in any manner, which may be dependent on the requirements of the radio. More levels may allow for better control of the radios at the expense of more memory to store these levels.

In the design shown in FIG. 4, the color chart 400 includes a cell (or a square box) for each unique combination of (a) an operating state for the aggressor radio of a particular RAT, band, and channel and (b) a particular channel for the radio A 326. Cell (i, j) may correspond to the operating state i for the aggressor radio and the channel j for the radio A 326. Cell (i, j) may be populated with a performance level of the radio A 326 when the aggressor radio is in operating state i and the broadcast multimedia receiver device 114 is operating on the channel j.

The design in FIG. 4 may allow for selection of an operating state for the aggressor radio that may cause less interference to the reception of a particular channel at the radio A 326.

For the design shown in FIG. 4, a color chart may cover U operating states for various aggressor radios of a particular RAT, band, and channel and V channels for the radio A 326, where U≥1 and V≥1. A total of U×V cells may be used to quantify the performance of the radio A 326 on the V channels with potential interference from the various aggressor radios operating on the listed RATs, bands, and channels.

As such, upon determining the RAT, the band, and the channel of an aggressor radio, the coexistence manager 342 may use the color chart 400 of the coexistence database 344 to determine a target operating state of the aggressor radio such that the performance of the radio A 326 may meet a threshold. If the performance of the aggressor radio under the interference of an aggressor radio operating in a particular RAT, band, and channel is not recorded in the color chart 400, the coexistence manager 342 may request the aggressor radio to change from one operating state to another iteratively and then measure the performance of the radio A 326 in each operating state. Based on the measurements, the coexistence manager 342 can determine a target operating state of the aggressor radio such that the performance of the radio A 326 may meet the threshold. Base on the target operating state, the coexistence manager 342 may determine the mitigation action to be applied to the aggressor radio.

Figure 5:
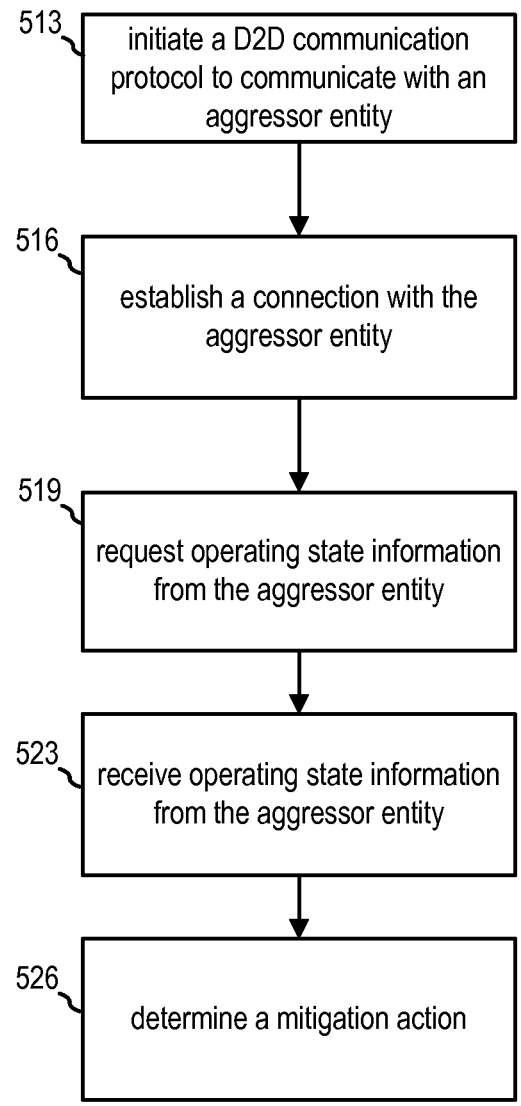
FIG. 5 is a flow chart of a method (process) for mitigating interference at a broadcast multimedia receiver device.

FIG. 5 is a flow chart 500 of a method (process) for mitigating interference at a broadcast multimedia receiver device. The method may be performed by a broadcast multimedia receiver device (e.g., the broadcast multimedia receiver device 114, the wireless device 802/902). At operation 513, the broadcast multimedia receiver device initiates a D2D communication protocol to communicate with an aggressor entity. For example, referring to FIG. 3, the coexistence manager 342 uses the discovery procedure in accordance with LTE Direct to discover and communicate with the wireless device 392.

At operation 516, the broadcast multimedia receiver device establishes a connection with the aggressor entity. For example, referring to FIG. 3, the coexistence manager 342 may establish a communication link 391 with the wireless device 392 and may use a communication protocol of LTE Direct to communicate with the wireless device 392.

At operation 519, the broadcast multimedia receiver device requests operating state information from the aggressor entity. For example, referring to FIG. 3, the coexistence manager 342 may send to the wireless device 392, on the communication link 391, a query message requesting information of the operating state of the wireless device 392 (i.e., the aggressor entity).

At operation 523, the broadcast multimedia receiver device receives the operating state information from the aggressor entity. For example, referring to FIG. 3, the coexistence manager 342 may receive from the wireless device 392, on the communication link 391, a response message including information of the operating state of the wireless device 392 (i.e., the aggressor entity).

At operation 526, the broadcast multimedia receiver device determines a mitigation action. For example, referring to FIG. 3, the coexistence manager 342 may determine, based on the operating state of the wireless device 392 and the information stored in the coexistence database 344, a mitigation action to be applied to the wireless device 392 in order to reduce the interference at the radio A 326 caused by the wireless device 392.

Figure 6:
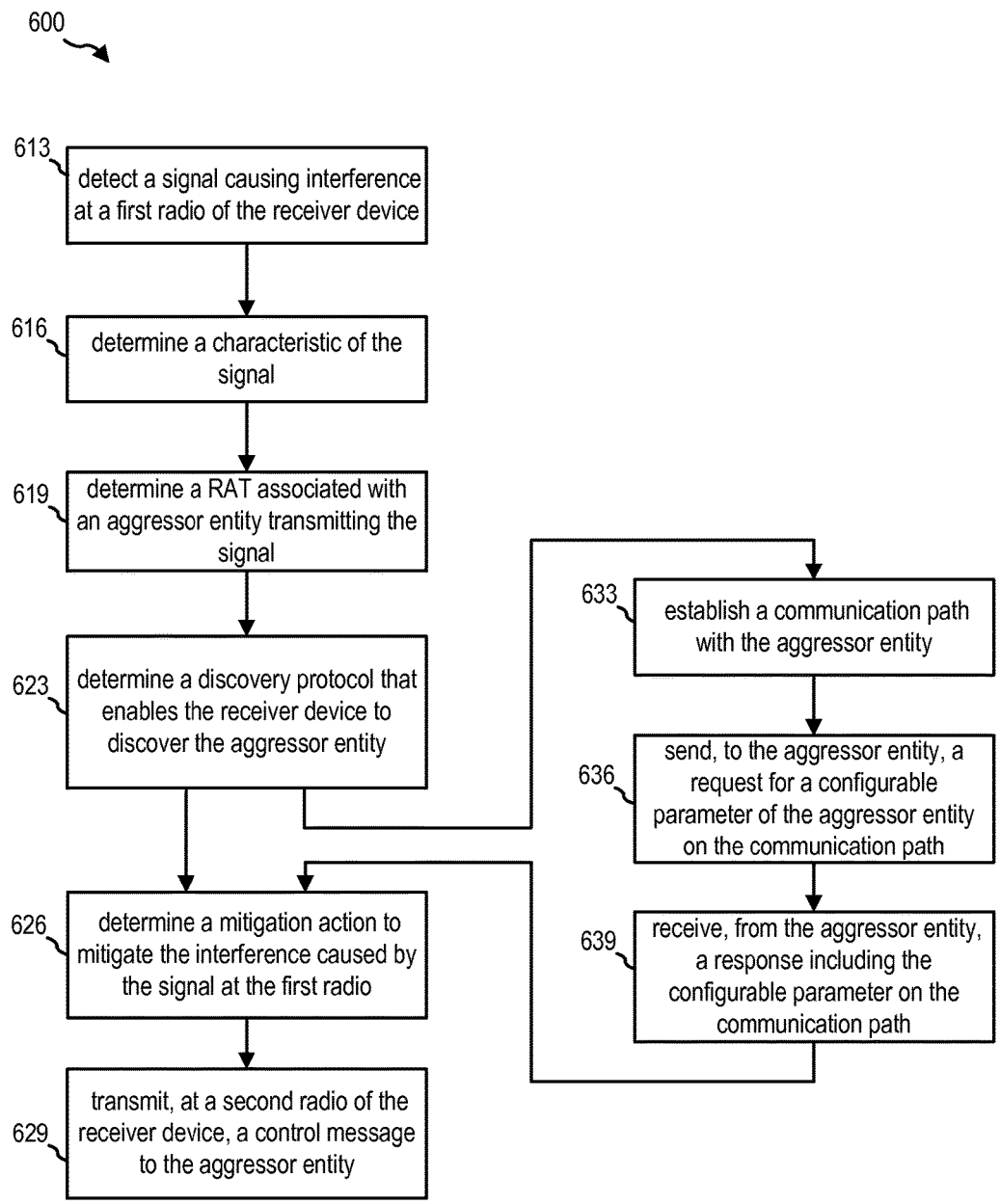
FIG. 6 is a flow chart of another method (process) for mitigating interference at a broadcast multimedia receiver device.

FIG. 6 is a flow chart 600 of another method (process) for mitigating interference at a broadcast multimedia receiver device. The method may be performed by a broadcast multimedia receiver device (e.g., the broadcast multimedia receiver device 114, the wireless device 802/902). At operation 613, the broadcast multimedia receiver device detects a signal causing interference at a first radio of the receiver device. The first radio is configured to receive broadcast multimedia transmissions. In certain configurations, the interference caused by the signal is detected based on an RSSI, an SNR, an SINR, or any combination thereof. For example, referring to FIG. 3, the coexistence manager 342 detects interference at the radio A 326 caused by the network access point 394 and/or the wireless device 392.

In certain configurations, the broadcast multimedia receiver device, at operation 616, determines a characteristic of the signal. At operation 619, the broadcast multimedia receiver device determines a RAT associated with an aggressor entity transmitting the signal. The aggressor entity is physically remote from the receiver device. The RAT is determined based on the characteristic of the signal. In certain configurations, the characteristic of the signal includes a frequency band of the signal, a frequency channel of the signal, a power level of the signal, an estimated distance between the aggressor entity and the receiver device, or any combination thereof. For example, referring to FIG. 3, the coexistence manager 342 may determine, based on the characteristics (e.g., the frequency band, the frequency channel, the energy level, the estimated distance between the aggressor entity and the broadcast multimedia receiver device 114) of the interference signals, that the aggressor entity is the wireless device 392, which is an LTE UE transmitting on an LTE uplink frequency channel.

In certain configurations, the broadcast multimedia receiver device determines, at operation 623, a discovery protocol that enables the receiver device to discover the aggressor entity. For example, referring to FIG. 3, the coexistence manager 342 may determine that the wireless device 392 is an LTE UE transmitting on the LTE UL. The coexistence manager 342 may further determine that an LTE UE may support LTE Direct. Accordingly, the coexistence manager 342 may decide to use LTE Direct to communicate with the wireless device 392. If the wireless device 392 is not responding in accordance with LTE Direct, the coexistence manager 342 may try to communicate with the wireless device 392 through one or more other D2D communication protocols.

In certain configurations, subsequent to operation 623, the broadcast multimedia receiver device, at operation 633, establishes a communication path with the aggressor entity. At operation 636, the broadcast multimedia receiver device sends, to the aggressor entity, a request for a configurable parameter of the aggressor entity on the communication path. At operation 639, the broadcast multimedia receiver device receives, from the aggressor entity, a response including the configurable parameter on the communication path. For example, referring to FIG. 3, the coexistence manager 342 establishes the communication link 393 with the network access point 394. The coexistence manager 342 obtains the configurable parameters from the network access point 394. In certain configurations, the communication path is a D2D communication link between the receiver device and the aggressor entity. For example, referring to FIG. 3, the coexistence manager 342 may establish the communication link 391 with the wireless device 392, which transmits signals in accordance with LTE Direct.

In certain configurations, the communication path with the aggressor entity includes an intermediate link between the receiver device and a network access point that is configured to communicate with the aggressor entity. In certain configurations, the network access point is an eNodeB, a WLAN access point, a base station, a small cell base station, a floating base station, or a base station on an aerial drone. For example, referring to FIG. 3 the coexistence manager 342 may communicate with the wireless device 392 via the communication link 393 and the communication link 395. In certain configurations, the intermediate link is a wired link. In certain configurations, the communication path includes a backhaul link of a broadcast service provider. Subsequently, the process proceeds to operation 626. For example, referring to FIG. 3 the coexistence manager 342 may communicate with the network access point 394 via the wired communication link 372 and the backhaul link 376. In another example, the coexistence manager 342 may communicate with the network access point 394 via the wired communication link 373.

At operation 626, the broadcast multimedia receiver device determines a mitigation action to mitigate the interference caused by the signal at the first radio. In certain configurations, the mitigation action is determined based on the characteristic of the signal. In certain configurations, the mitigation action includes a request to the aggressor entity to adjust a transmission power of the signal, a transmission frequency of the signal, a transmission time of the signal, a transmission modulation mode of the signal, a transmission RAT of the signal, or any combination thereof. In certain configurations, the mitigation action includes a request to the aggressor entity to adjust an operation state associated with the RAT used by the aggressor entity transmitting the signal. In certain configurations, the mitigation action includes a request to the aggressor entity to adjust, iteratively, one or more configurable parameters associated with the RAT used by the aggressor entity transmitting the signal until the interference at the first radio of the receiver device caused by the signal is within a defined relationship with a threshold. For example, referring to FIGS. 3-4, the coexistence manager 342 may determine a mitigation action based on the performance information of the radio A 326.

At operation 629, the broadcast multimedia receiver device transmits, at a second radio of the receiver device, a control message to the aggressor entity. The control message instructs the aggressor entity to implement the mitigation action. The second radio is configured to communicate with the aggressor entity using at least one RAT or a wired interface. In certain configurations, the at least one RAT used to communicate with the aggressor entity includes a deviceto-device (D2D) RAT, a WWAN RAT, a WLAN RAT, a BLUETOOTH technology, the determined RAT, or any combination thereof. In certain configurations, the aggressor entity is a UE, an eNodeB, a WLAN access point, a base station, a small cell base station, a floating base station, or a base station on an aerial drone. For example, referring to FIG. 3, the coexistence manager 342 sends, to the network access point 394, a control message requesting that the network access point 394 change from one operating state to another operating state.

In certain configurations, the broadcast multimedia receiver device includes a database that stores information of interference at the first radio caused by at least one wireless device. The aggressor entity is determined based on the database and the signal. The broadcast multimedia receiver device further includes a modem associated with the second radio. The broadcast multimedia receiver device also includes a coexistence manager that determines the mitigation action and controls the second radio. In certain configurations, the stored information indicates the interference at the first radio as a function of a frequency band associated with the signal, a transmission power associated with the signal, or any combination thereof. For example, referring to FIG. 4, the coexistence manager 342 uses the coexistence database 344 having the color chart 400 to determine a mitigation action.

Figure 7:
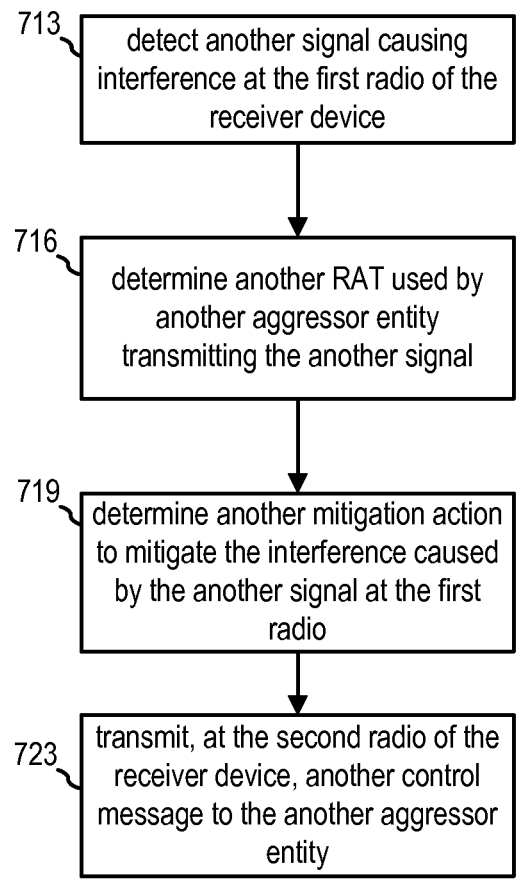
FIG. 7 is a flow chart of yet another method (process) for mitigating interference at a broadcast multimedia receiver device.

FIG. 7 is a flow chart 700 of yet another method (process) for mitigating interference at a broadcast multimedia receiver device. The method may be performed by a broadcast multimedia receiver device (e.g., the broadcast multimedia receiver device 114, the wireless device 802/902). In certain configurations, concurrent with one or more operations illustrated FIG. 6, the broadcast multimedia receiver device may perform the following operations. At operation 713, the broadcast multimedia receiver device detects another signal causing interference at the first radio of the receiver device. At operation 716, the broadcast multimedia receiver device determines another RAT used by another aggressor entity transmitting the another signal. At operation 719, the broadcast multimedia receiver device determines another mitigation action to mitigate the interference caused by the another signal at the first radio. At operation 723, the broadcast multimedia receiver device transmits, at the second radio of the receiver device, another control message to the another aggressor entity. The another control message instructs the another aggressor entity to implement the another mitigation action. The second radio is configured to transmit using at least one RAT or a wired interface.

For example, referring to FIG. 3, the network access point 394 may be an LTE eNodeB and the wireless device 392 may be an LTE UE in a close proximity of the broadcast multimedia receiver device 114. The radio A 326 may observe interference from the network access point 394 and the wireless device 392 at the same time. The coexistence manager 342 may identify the network access point 394 and the wireless device 392. Then the coexistence manager 342 can determine a respective mitigation action to be applied to a respective one of the network access point 394 and the wireless device 392. The coexistence manager 342 may construct a control message indicating the mitigation action for each of the network access point 394 and the wireless device 392. Then the coexistence manager 342 use the TX/RX module/circuitry B 334 and the radio B 328 to transmit the control messages to the network access point 394 and the wireless device 392.

Figure 8:
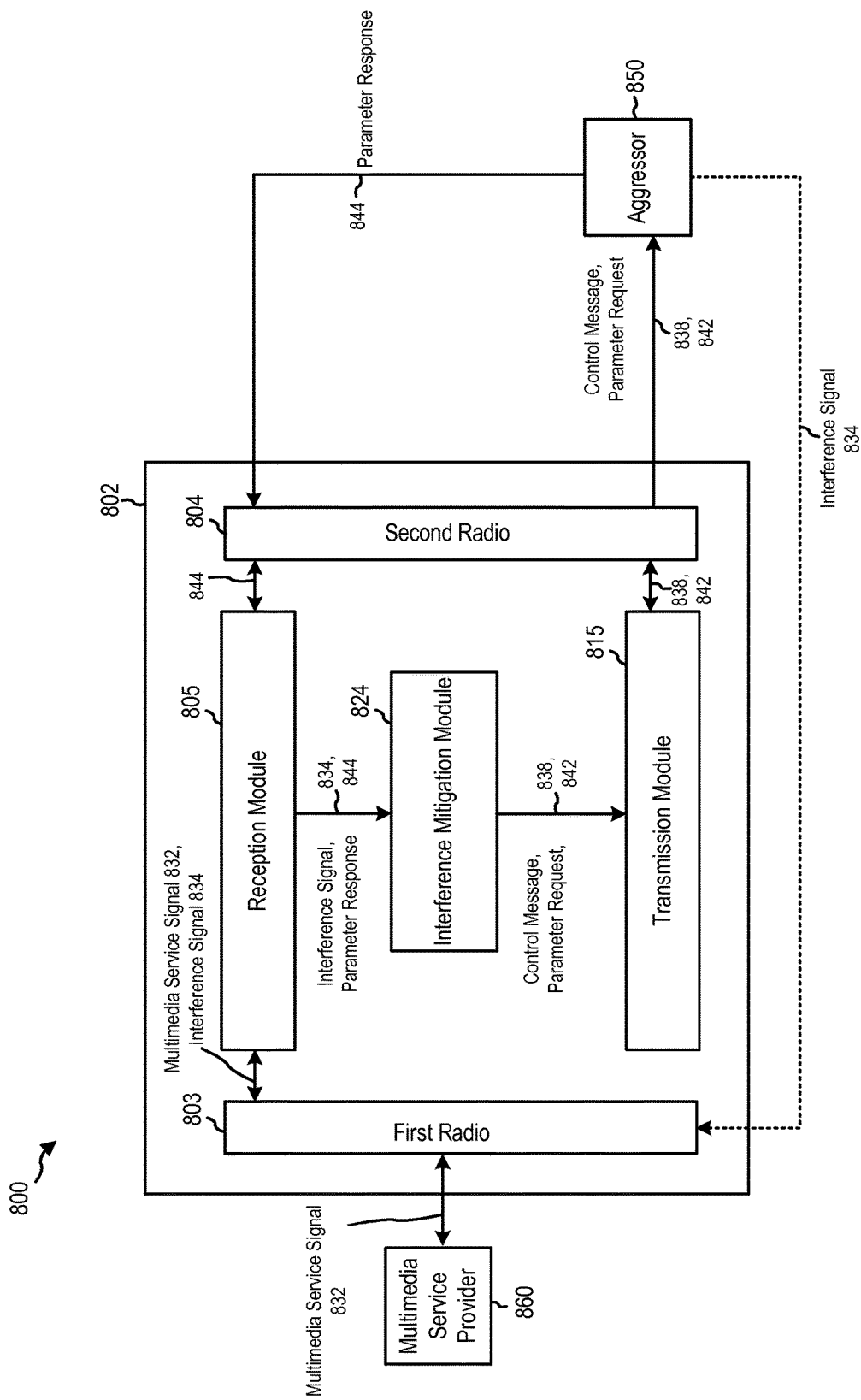
FIG. 8 is a functional block diagram of an example wireless device.

FIG. 8 is a functional block diagram of an example wireless communication device 802. The wireless communication device 802 may include a reception module/circuitry 805, a transmission module/circuitry 815, and an interference mitigation module/circuitry 824. The interference mitigation module/circuitry 824 may be configured to perform the various functions recited herein.

The wireless communication device 802 may be a broadcast multimedia receiver device. The reception module/circuitry 805 may be configured to receive an interference signal 834 from, via a first radio 803 of the wireless communication device 802, an aggressor entity 850 and to send the interference signal 834 to the interference mitigation module/circuitry 824. The interference mitigation module/circuitry 824 may be configured to detect the interference signal 834 causing interference at the first radio 803. The first radio 803 is configured to receive broadcast multimedia transmissions including multimedia service signals 832 from a multimedia service provider 860. The interference mitigation module/circuitry 824 may be configured to determine a RAT associated with an aggressor entity 850 transmitting the interference signal 834. The aggressor entity 850 is physically remote from the wireless communication device 802. The interference mitigation module/circuitry 824 may be configured to determine a mitigation action to mitigate the interference caused by the interference signal 834 at the first radio 803. The interference mitigation module/circuitry 824 may be configured to transmit a control message 838 to the transmission module/circuitry 815. The transmission module/circuitry 815 may be configured to use a second radio 804 of the wireless communication device 802 to transmit the control message 838 to the aggressor entity 850. The control message 838 instructs the aggressor entity 850 to implement the mitigation action. The second radio 804 is configured to communicate with the aggressor entity 850 using at least one RAT or a wired interface.

In certain configurations, the at least one RAT used to communicate with the aggressor entity includes a D2D RAT, a WWAN RAT, a WLAN RAT, a BLUETOOTH technology, the determined RAT, or any combination thereof. In certain configurations, the aggressor entity 850 is a UE, an eNodeB, a WLAN access point, a base station, a small cell base station, a floating base station, or a base station on an aerial drone. In certain configurations, the interference mitigation module/circuitry 824 may be configured to determine a characteristic of the interference signal 834. The RAT is determined based on the characteristic of the interference signal 834. In certain configurations, the characteristic of the interference signal 834 includes a frequency band of the interference signal 834, a frequency channel of the interference signal 834, a power level of the interference signal 834, an estimated distance between the aggressor entity 850 and the wireless communication device 802, or any combination thereof. In certain configurations, the mitigation action is determined based on the characteristic of the interference signal 834. In certain configurations, the interference caused by the interference signal 834 is detected based on an RSSI, an SNR, an SINR, or any combination thereof.

In certain configurations, the interference mitigation module/circuitry 824 may be configured to determine a discovery protocol that enables the wireless communication device 802 to discover the aggressor entity 850 based on the characteristic of the interference signal 834.

In certain configurations, the interference mitigation module/circuitry 824 may be configured to include a database that stores information of interference at the first radio 803 caused by at least one wireless device. The aggressor entity 850 is determined based on the database and the interference signal 834. The interference mitigation module/circuitry 824 may be configured to employ a modem associated with the second radio 804 and including the reception module/circuitry 805 and the transmission module/circuitry 815. The interference mitigation module/circuitry 824 may be configured to include a coexistence manager that determines the mitigation action and controls the second radio 804. In certain configurations, the stored information indicates the interference at the first radio 803 as a function of a frequency band associated with the interference signal 834, a transmission power associated with the interference signal 834, or any combination thereof.

In certain configurations, the reception module/circuitry 805, the interference mitigation module/circuitry 824, and/or the transmission module/circuitry 815 may be configured to establish a communication path with the aggressor entity 850. The interference mitigation module/circuitry 824 may be configured to send a parameter request 842 for a configurable parameter of the aggressor entity to the transmission module/circuitry 815. The transmission module/circuitry 815 may be configured to send to the aggressor entity 850, via the second radio 804, the parameter request 842 on the communication path. The reception module/circuitry 805 may be configured to receive from the aggressor entity 850, via the second radio 804, a parameter response 844 including the configurable parameter on the communication path. The interference mitigation module/circuitry 824 may be configured to receive, from the reception module/circuitry 805, the parameter response 844. In certain configurations, the communication path is a D2D communication link between the wireless communication device 802 and the aggressor entity 850. In certain configurations, the communication path with the aggressor entity 850 includes an intermediate link between the wireless communication device 802 and a network access point that is configured to communicate with the aggressor entity 850. In certain configurations, the network access point is an eNodeB, a WLAN access point, a base station, a small cell base station, a floating base station, or a base station on an aerial drone. In certain configurations, the intermediate link is a wired link. In certain configurations, the communication path includes a backhaul link of a broadcast service provider.

In certain configurations, the mitigation action includes sending a request to the aggressor entity 850 to adjust a transmission power of the interference signal 834, a transmission frequency of the interference signal 834, a transmission time of the interference signal 834, a transmission modulation mode of the interference signal 834, a transmission RAT of the interference signal 834, or any combination thereof. In certain configurations, the mitigation action includes a request to the aggressor entity 850 to adjust an operation state associated with the RAT used by the aggressor entity 850 transmitting the interference signal 834. In certain configurations, the mitigation action includes a request to the aggressor entity 850 to adjust, iteratively, one or more configurable parameters associated with the RAT used by the aggressor entity 850 transmitting the interference signal 834 until the interference at the first radio 803 of the wireless communication device 802 caused by the interference signal 834 is within a defined relationship with a threshold.

In certain configurations, the reception module/circuitry 805 may be configured to receive, via the first radio 803, another interference signal 834 from another aggressor entity 850. The interference mitigation module/circuitry 824 may be configured to detect the another interference signal 834 causing interference at the first radio 803 of the wireless communication device 802. The interference mitigation module/circuitry 824 may be configured to determine another RAT used by the another aggressor entity 850 transmitting the another interference signal 834. The interference mitigation module/circuitry 824 may be configured to determine another mitigation action to mitigate the interference caused by the another interference signal 834 at the first radio 803. The interference mitigation module/circuitry 824 may be configured to transmit another control message 838 to the transmission module/circuitry 815. The transmission module/circuitry 815 may be configured to use the second radio 804 of the wireless communication device 802 to transmit the another control message 838 to the another aggressor entity 850. The another control message 838 instructs the another aggressor entity 850 to implement the another mitigation action. The second radio 804 is configured to transmit using at least one RAT or a wired interface.

The apparatus may include additional modules that perform each of the blocks of the algorithm in the aforementioned flowcharts of FIGS. 5-7. As such, each block in the aforementioned flowcharts of FIGS. 5-7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
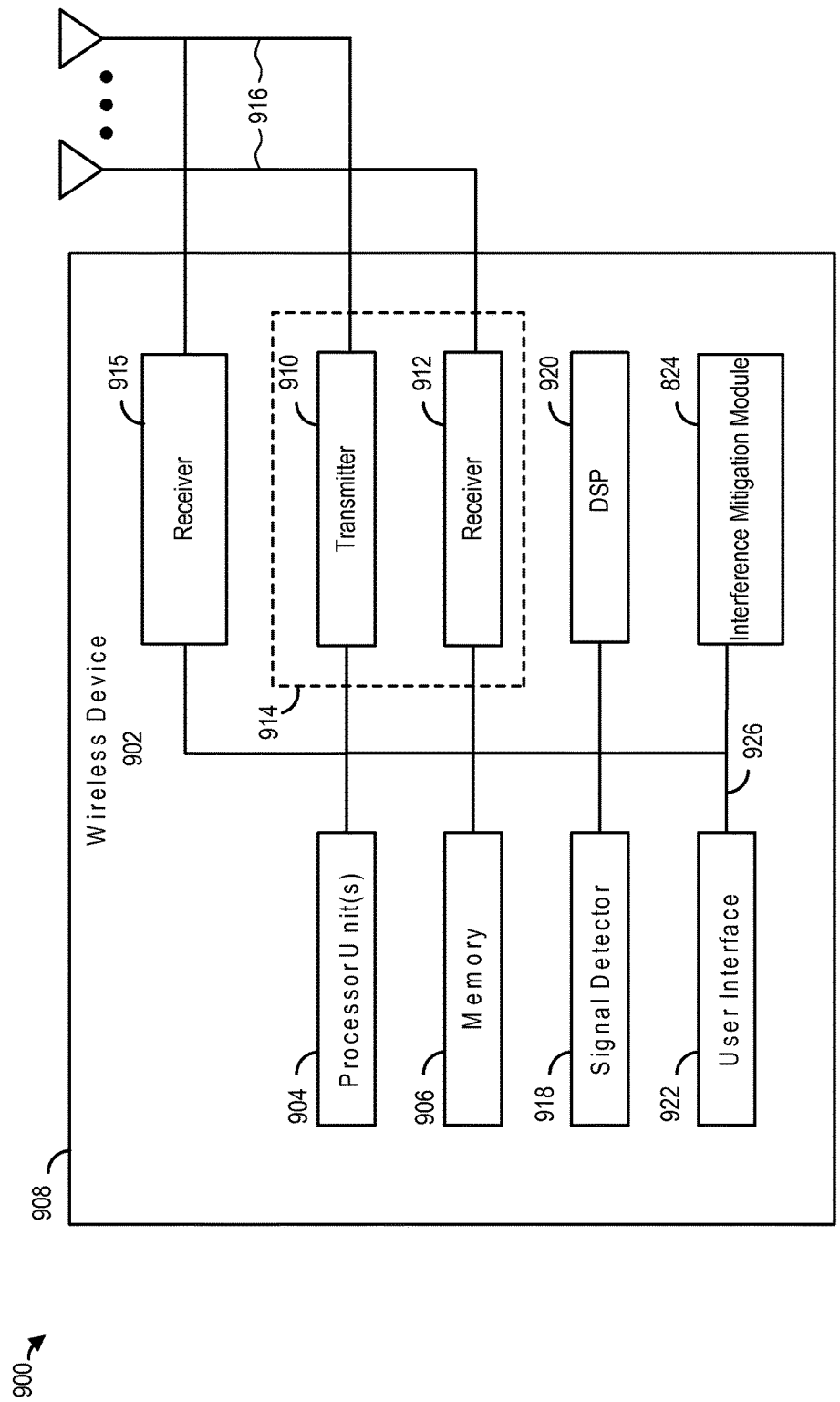
FIG. 9 is a diagram illustrating an example of a hardware implementation of a wireless device.

FIG. 9 is a diagram 900 illustrating an example of a hardware implementation of a wireless device 902 that may be employed within the wireless communication networks of FIG. 1 or FIG. 3. The wireless device 902 is an example of a device that may be configured to implement the various methods described herein. For example, the wireless device 902 may be the broadcast multimedia receiver device 114.

The wireless device 902 may include a processor 904 which controls operation of the wireless device 902. The processor 904 may also be referred to as a central processing unit (CPU). Memory 906, which may include both read-only memory (ROM) and random access memory (RAM), may provide instructions and data to the processor 904. A portion of the memory 906 may also include non-volatile random access memory (NVRAM). The processor 904 typically performs logical and arithmetic operations based on program instructions stored within the memory 906. The instructions in the memory 906 may be executable (by the processor 904, for example) to implement the methods described herein.

The processor 904 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 902 may also include a housing 908 that may include a transmitter 910 and/or a receiver 912 to allow transmission and reception of data between the wireless device 902 and a remote device. The wireless device 902 may also include another receiver 915 that may receive multimedia broadcast service signals. The transmitter 910 and the receiver 912 may be combined into a transceiver 914. One or more antennas 916 may be attached to the housing 908 and electrically coupled to the transceiver 914 and the receiver 915. The wireless device 902 may further include (not shown) multiple other transmitters, multiple receivers, multiple transceivers, and/or multiple antennas.

The wireless device 902 may also include a signal detector 918 that may be used to detect and quantify the level of signals received by the transceiver 914 or the receiver 912. The signal detector 918 may detect such signals as total energy, energy per subcarrier per symbol, power spectral density, and other signals. The wireless device 902 may also include a digital signal processor (DSP) 920 for use in processing signals. The DSP 920 may be configured to generate a packet for transmission. In some aspects, the packet may comprise a physical layer data unit (PPDU).

The wireless device 902 may further comprise a user interface 922 in some aspects. The user interface 922 may comprise a keypad, a microphone, a speaker, and/or a display. The user interface 922 may include any element or component that conveys information to a user of the wireless device 902 and/or receives input from the user.

The wireless device 902 also includes the interference mitigation module/circuitry 824. The interference mitigation module/circuitry 824 may employ, among other components, the processor 904, the memory 906, and/or the DSP 920. The DSP 920 may implement the transmission module/circuitry 815 and the reception module/circuitry 805 of the wireless communication device 802 as well as the RX module/circuitry A 332 and the TX/RX module/circuitry B 334 of the broadcast multimedia receiver device 114. The receiver 915 may constitute the radio A 326 of the broadcast multimedia receiver device 114. The receiver 912 and the transmitter 910 may constitute the radio B 328 of the broadcast multimedia receiver device 114.

The various components of the wireless device 902 may be coupled together by a bus system 926. The bus system 926 may include a data bus, for example, as well as a power bus, a control signal bus, and a status signal bus in addition to the data bus. Components of the wireless device 902 may be coupled together or accept or provide inputs to each other using some other mechanism.

Although a number of separate components are illustrated in FIG. 9, one or more of the components may be combined or commonly implemented. For example, the processor 904 may be used to implement not only the functionality described above with respect to the processor 904, but also to implement the functionality described above with respect to the signal detector 918, the DSP 920, the user interface 922, and/or the interference mitigation module/circuitry 824. Further, each of the components illustrated in FIG. 9 may be implemented using a plurality of separate elements.

In one aspect, the wireless device 802/902 may be a broadcast multimedia receiver device. The wireless device 802/902 may include means for detecting a signal causing interference at a first radio of the receiver device. The first radio is configured to receive broadcast multimedia transmissions. The wireless device 802/902 may include means for determining a RAT associated with an aggressor entity transmitting the signal. The aggressor entity is physically remote from the receiver device. The wireless device 802/902 may include means for determining a mitigation action to mitigate the interference caused by the signal at the first radio. The wireless device 802/902 may include means for transmitting, at a second radio of the receiver device, a control message to the aggressor entity. The control message instructs the aggressor entity to implement the mitigation action. The second radio is configured to communicate with the aggressor entity using at least one RAT or a wired interface.

In certain configurations, the at least one RAT used to communicate with the aggressor entity includes a D2D RAT, a WWAN RAT, a WLAN RAT, a BLUETOOTH technology, the determined RAT, or any combination thereof. In certain configurations, the aggressor entity is a UE, an eNodeB, a WLAN access point, a base station, a small cell base station, a floating base station, or a base station on an aerial drone. In certain configurations, the wireless device 802/902 may include means for determining a characteristic of the signal. The RAT is determined based on the characteristic of the signal. In certain configurations, the characteristic of the signal includes a frequency band of the signal, a frequency channel of the signal, a power level of the signal, an estimated distance between the aggressor entity and the receiver device, or any combination thereof. In certain configurations, the wireless device 802/902 may include means for determining a characteristic of the signal. The mitigation action is determined based on the characteristic of the signal. In certain configurations, the interference caused by the signal is detected based on an RSSI, an SNR, an SINR, or any combination thereof. In certain configurations, the wireless device 802/902 may include means for determining a discovery protocol that enables the receiver device to discover the aggressor entity.

In certain configurations, the wireless device 802/902 may include a database that stores information of interference at the first radio caused by at least one wireless device. The aggressor entity is determined based on the database and the signal. The wireless device 802/902 may include a modem associated with the second radio. The wireless device 802/902 may include a coexistence manager that determines the mitigation action and controls the second radio. In certain configurations, the stored information indicates the interference at the first radio as a function of a frequency band associated with the signal, a transmission power associated with the signal, or any combination thereof.

In certain configurations, the wireless device 802/902 may include means for establishing a communication path with the aggressor entity. The wireless device 802/902 may include means for sending, to the aggressor entity, a request for a configurable parameter of the aggressor entity on the communication path. The wireless device 802/902 may include means for receiving, from the aggressor entity, a response including the configurable parameter on the communication path. In certain configurations, the communication path is a D2D communication link between the receiver device and the aggressor entity. In certain configurations, the communication path with the aggressor entity includes an intermediate link between the receiver device and a network access point that is configured to communicate with the aggressor entity.

In certain configurations, the network access point is an eNodeB, a WLAN access point, a base station, a small cell base station, a floating base station, or a base station on an aerial drone. In certain configurations, the intermediate link is a wired link. In certain configurations, the communication path includes a backhaul link of a broadcast service provider.

In certain configurations, the mitigation action includes a request to the aggressor entity to adjust a transmission power of the signal, a transmission frequency of the signal, a transmission time of the signal, a transmission modulation mode of the signal, a transmission RAT of the signal, or any combination thereof. In certain configurations, the mitigation action includes a request to the aggressor entity to adjust an operation state associated with the RAT used by the aggressor entity transmitting the signal. In certain configurations, the mitigation action includes a request to the aggressor entity to adjust, iteratively, one or more configurable parameters associated with the RAT used by the aggressor entity transmitting the signal until the interference at the first radio of the receiver device caused by the signal is within a defined relationship with a threshold.

In certain configurations, the wireless device 802/902 may include means for detecting another signal causing interference at the first radio of the receiver device. The wireless device 802/902 may include means for determining another RAT used by another aggressor entity transmitting the another signal. The wireless device 802/902 may include means for determining another mitigation action to mitigate the interference caused by the another signal at the first radio. The wireless device 802/902 may include means for transmitting, at the second radio of the receiver device, another control message to the another aggressor entity. The another control message instructs the another aggressor entity to implement the another mitigation action. The second radio is configured to transmit using at least one RAT or a wired interface.

The aforementioned means may be one or more of the aforementioned modules of the wireless device 802/902 configured to perform the functions recited by the aforementioned means. The various operations of methods described above may be performed by any suitable means capable of performing the operations, such as various hardware and/or software component(s), circuits, and/or module (s). Generally, any operations illustrated in the Figures may be performed by corresponding functional means capable of performing the operations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a broadcast multimedia receiver device, comprising:
    detecting a signal causing interference at a first radio of the receiver device, wherein the first radio is configured to receive broadcast multimedia transmissions;
    determining a characteristic of the signal;
    determining a radio access technology (RAT) associated with an aggressor entity transmitting the signal based at least on the characteristic of the signal, wherein the aggressor entity is physically remote from the receiver device;
    determining a discovery protocol that enables the receiver device to discover and establish a communication path with the aggressor entity based at least on the characteristic of the signal;
    establishing the communication path with the aggressor entity based on determining the discovery protocol;
    determining a mitigation action to mitigate the interference caused by the signal at the first radio; and
    transmitting, at a second radio of the receiver device, a control message to the aggressor entity, wherein the control message instructs the aggressor entity to implement the mitigation action, and wherein the second radio is configured to communicate with the aggressor entity using at least one RAT or a wired interface.

2. The method of claim 1, wherein the at least one RAT used to communicate with the aggressor entity includes a device-to-device (D2D) RAT, a wireless wide area network (WWAN) RAT, a wireless local area network (WLAN) RAT, a BLUETOOTH technology, the determined RAT, or any combination thereof.

3. The method of claim 1, wherein the aggressor entity is a user equipment (UE), an evolved node B (eNodeB), a wireless local area network (WLAN) access point, a base station, a small cell base station, a floating base station, or a base station on an aerial drone.

4. The method of claim 1, wherein the characteristic of the signal includes a frequency band of the signal, a frequency channel of the signal, a power level of the signal, an estimated distance between the aggressor entity and the receiver device, or any combination thereof.

5. The method of claim 1, wherein the mitigation action is determined based on the characteristic of the signal.

6. The method of claim 1, wherein the interference caused by the signal is detected based on a received signal strength indication (RSSI), a signal-to-noise ratio (SNR), a signal-to-interference-plus-noise ratio (SINR), or any combination thereof.

7. The method of claim 1, wherein the receiver device includes:
- a database that stores information of interference at the first radio caused by at least one wireless device, wherein the aggressor entity is determined based on the database and the signal;
- a modem associated with the second radio; and
- a coexistence manager that determines the mitigation action and controls the second radio.

8. The method of claim 7, wherein the stored information indicates the interference at the first radio as a function of a frequency band associated with the signal, a transmission power associated with the signal, or any combination thereof.

9. The method of claim 1, further comprising:
- sending, to the aggressor entity, a request for a configurable parameter of the aggressor entity on the communication path; and
- receiving, from the aggressor entity, a response including the configurable parameter on the communication path.

10. The method of claim 9, wherein the communication path is a device-to-device (D2D) communication link between the receiver device and the aggressor entity.

11. The method of claim 9, wherein the communication path with the aggressor entity includes an intermediate link between the receiver device and a network access point that is configured to communicate with the aggressor entity.

12. The method of claim 11, wherein the network access point is an evolved node B (eNodeB), a wireless local area network (WLAN) access point, a base station, a small cell base station, a floating base station, or a base station on an aerial drone.

13. The method of claim 11, wherein the intermediate link is a wired link.

14. The method of claim 9, wherein the communication path includes a backhaul link of a broadcast service provider.

15. The method of claim 1, wherein the mitigation action includes a request to the aggressor entity to adjust a transmission power of the signal, a transmission frequency of the signal, a transmission time of the signal, a transmission modulation mode of the signal, a transmission RAT of the signal, or any combination thereof.

16. The method of claim 1, wherein the mitigation action includes a request to the aggressor entity to adjust an operation state associated with the RAT used by the aggressor entity transmitting the signal.

17. The method of claim 1, wherein the mitigation action includes a request to the aggressor entity to adjust, iteratively, one or more configurable parameters associated with the RAT used by the aggressor entity transmitting the signal until the interference at the first radio of the receiver device caused by the signal is within a defined relationship with a threshold.

18. The method of claim 1, further comprising:
- detecting another signal causing interference at the first radio of the receiver device;
- determining another RAT used by another aggressor entity transmitting the another signal;
- determining another mitigation action to mitigate the interference caused by the another signal at the first radio; and
- transmitting, at the second radio of the receiver device, another control message to the another aggressor entity, wherein the another control message instructs the another aggressor entity to implement the another mitigation action, and wherein the second radio is configured to transmit using at least one RAT or a wired interface.

19. An apparatus for wireless communication, the apparatus being a broadcast multimedia receiver device, comprising:
- means for detecting a signal causing interference at a first radio of the receiver device, wherein the first radio is configured to receive broadcast multimedia transmissions;
- means for determining a characteristic of the signal;
- means for determining a radio access technology (RAT) associated with an aggressor entity transmitting the signal based at least on the characteristic of the signal, wherein the aggressor entity is physically remote from the receiver device;
- determining a discovery protocol that enables the receiver device to discover and establish a communication path with the aggressor entity based at least on the characteristic of the signal;
- means for establishing the communication path with the aggressor entity based on determining the discovery protocol;
- means for determining a mitigation action to mitigate the interference caused by the signal at the first radio; and
- means for transmitting, at a second radio of the receiver device, a control message to the aggressor entity, wherein the control message instructs the aggressor entity to implement the mitigation action, and wherein the second radio is configured to communicate with the aggressor entity using at least one RAT or a wired interface.

20. The apparatus of claim 19, wherein the characteristic of the signal includes a frequency band of the signal, a frequency channel of the signal, a power level of the signal, an estimated distance between the aggressor entity and the receiver device, or any combination thereof.

21. The apparatus of claim 19, wherein the mitigation action is determined based on the characteristic of the signal.

22. The apparatus of claim 19, further comprising:
- a database that stores information of interference at the first radio caused by at least one wireless device, wherein the aggressor entity is determined based on the database and the signal;
- a modem associated with the second radio; and
- a coexistence manager that determines the mitigation action and controls the second radio.

23. The apparatus of claim 19, wherein the mitigation action includes a request to the aggressor entity to adjust a transmission power of the signal, a transmission frequency of the signal, a transmission time of the signal, a transmission modulation mode of the signal, a transmission RAT of the signal, or any combination thereof.

24. The apparatus of claim 19, wherein the mitigation action includes a request to the aggressor entity to adjust an operation state associated with the RAT used by the aggressor entity transmitting the signal.

25. An apparatus for wireless communication, the apparatus being a broadcast multimedia receiver device, comprising:
- a memory; and
- at least one processor coupled to the memory and configured to:
- detect a signal causing interference at a first radio of the receiver device, wherein the first radio is configured to receive broadcast multimedia transmissions;
- determine a characteristic of the signal;

determine a radio access technology (RAT) associated with an aggressor entity transmitting the signal based at least on the characteristic of the signal, wherein the aggressor entity is physically remote from the receiver device;

determine a discovery protocol that enables the receiver device to discover and establish a communication path with the aggressor entity based at least on the characteristic of the signal;

establish the communication path with the aggressor entity based on determining the discovery protocol;

determine a mitigation action to mitigate the interference caused by the signal at the first radio; and transmit, at a second radio of the receiver device, a control message to the aggressor entity, wherein the control message instructs the aggressor entity to implement the mitigation action, and wherein the second radio is configured to communicate with the aggressor entity using at least one RAT or a wired interface.

26. A non-transitory computer-readable medium storing computer executable code for wireless communication at a broadcast multimedia receiver device, comprising code for:

detecting a signal causing interference at a first radio of the receiver device, wherein the first radio is configured to receive broadcast multimedia transmissions;

determining a characteristic of the signal;

determining a radio access technology (RAT) associated with an aggressor entity transmitting the signal based at least on the characteristic of the signal, wherein the aggressor entity is physically remote from the receiver device;

determining a discovery protocol that enables the receiver device to discover and establish a communication path with the aggressor entity based at least on the characteristic of the signal;

establishing the communication path with the aggressor entity based on determining the discovery protocol;

determining a mitigation action to mitigate the interference caused by the signal at the first radio; and transmitting, at a second radio of the receiver device, a control message to the aggressor entity, wherein the control message instructs the aggressor entity to implement the mitigation action, and wherein the second radio is configured to communicate with the aggressor entity using at least one RAT or a wired interface.

* * * * *